Dec. 12, 1939.   V. M. LUTZ   2,183,199
PISTON RING
Filed Oct. 9, 1937   2 Sheets-Sheet 1
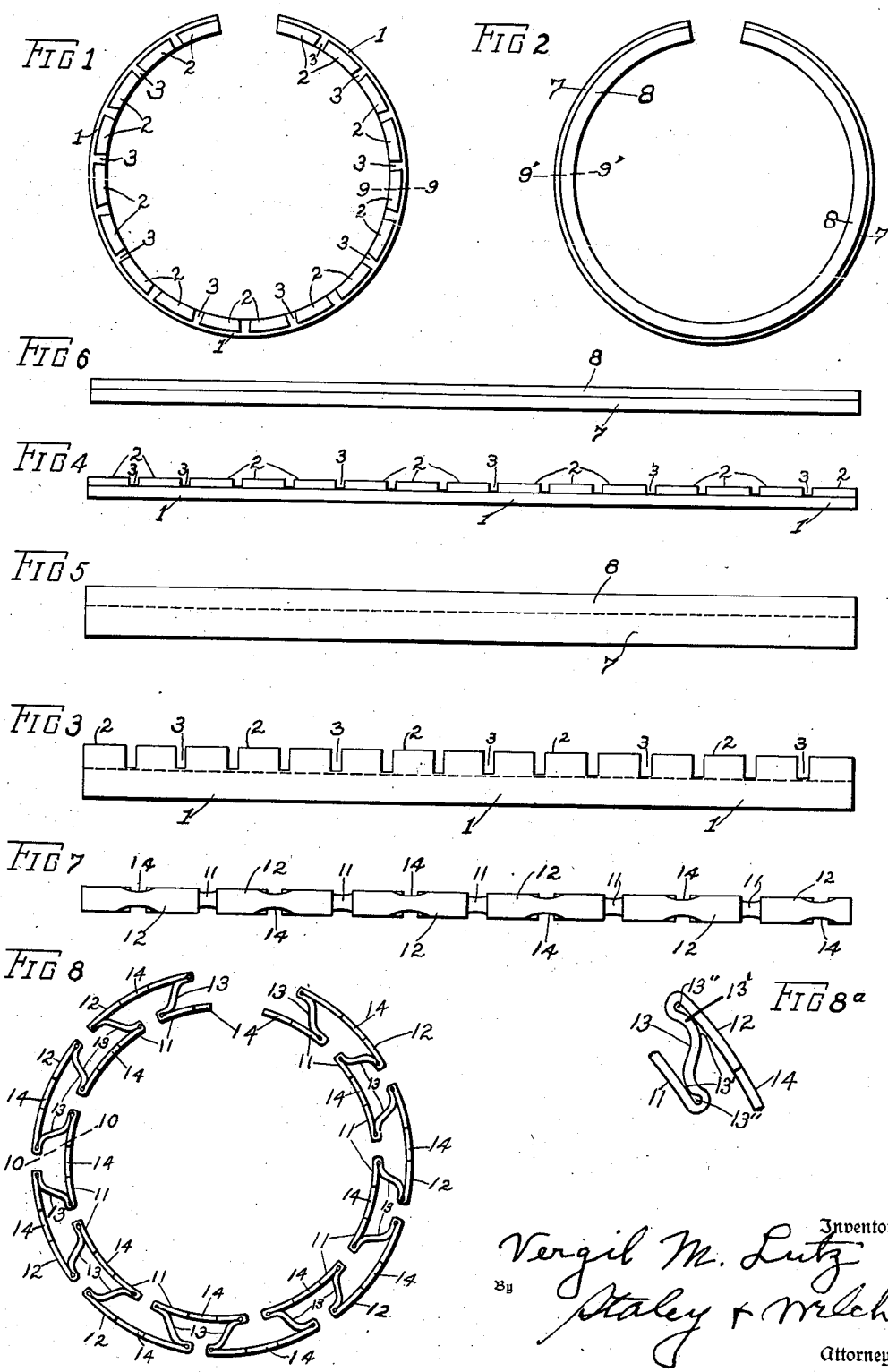
Inventor
Vergil M. Lutz
By Staley & Welch
Attorneys Dec. 12, 1939.　　　V. M. LUTZ　　　2,183,199
PISTON RING
Filed Oct. 9, 1937　　　2 Sheets-Sheet 2

Vergil M. Lutz, Inventor
By Staley & Welch
Attorneys

Patented Dec. 12, 1939

2,183,199

UNITED STATES PATENT OFFICE 2,183,199

PISTON RING

Vergil M. Lutz, Springfield, Ohio

Application October 9, 1937, Serial No. 168,229

8 Claims. (Cl. 309—45)

This invention relates to piston rings, it more particularly relating to piston rings of a character in which a plurality of rings are placed in a ring groove of the piston.

When a plurality of piston rings, either oil or compression rings, are placed in a single groove of the piston it has been the practice to separate the rings by a spacer, usually of cast iron construction.

The objects of the present invention is to provide an arrangement whereby the separate spacing ring is eliminated and the rings formed with integral spacing elements which act effectively to hold the rings in proper spaced relation.

In the accompanying drawings:

Fig. 1 is an elevation of the inner side of one of the piston rings, this view showing a ring which is particularly adapted as an oil ring.

Fig. 2 is an elevation of the inner side of a piston ring such as is used as compression ring.

Fig. 3 is an elevation of the blank from which an oil ring is formed.

Fig. 4 is an elevation of the inner edge of an oil ring after the spacing elements have been bent upon the ring proper, but before the ring has been bent to circular form.

Fig. 5 is an elevation of the blank from which a compression ring has been formed.

Fig. 6 is an elevation of the inner edge of the compression ring shown in Fig. 5 after the spacing element has been bent thereon but before the ring has been bent to circular form.

Fig. 7 is an elevation of that edge of the inner expanding device which contacts the piston after the ring has been formed but before it has been bent to circular shape.

Fig. 8 is an elevation of one side of the inner expanding device after it has been bent to circular form.

Fig. 8a is an enlarged view of a portion of the inner expanding device as viewed in Fig. 8.

Figure 10:
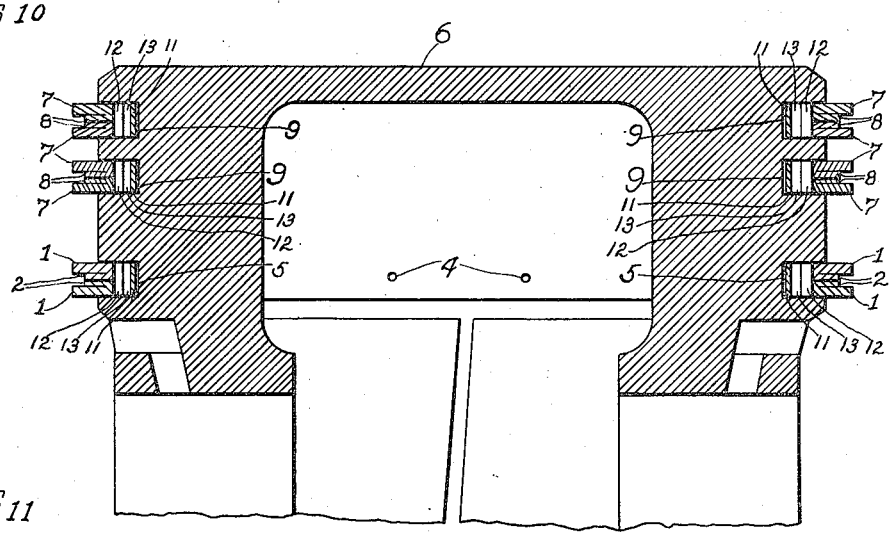

Fig. 10 is a vertical section of the piston and its ring grooves showing the oil and compression rings and also the inner low pressure expansion device installed therein, the rings being shown in section on the lines 9—9 and 9'—9' of Figs. 1 and 2 and the inner expansion device on the line 10—10 of Fig. 8.

Figures 11, 12:
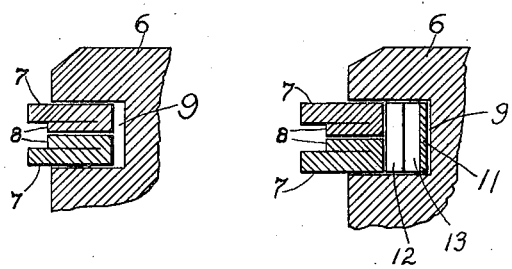

Fig. 11 is an enlarged view in section of a portion of the piston and one of its ring grooves with a pair of the rings installed therein, the rings in this view being the compression rings, the section through the rings being on the line 9'—9' of Fig. 2.

Fig. 12 is an enlarged view in section of a portion of the piston and one of its ring grooves with a pair of the rings and the inner low expansion device installed therein, the rings in this case being the compression rings and shown in the section line 9'—9' of Fig. 2.

Figure 9:
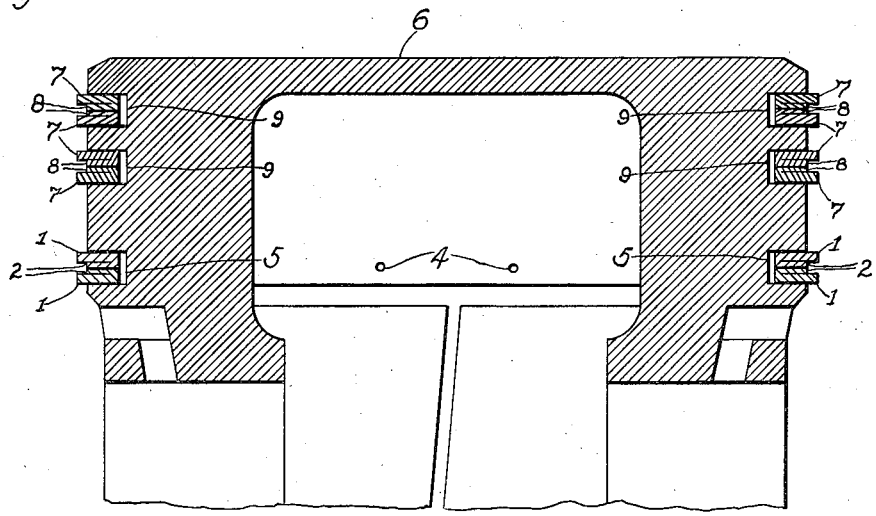
Fig. 9 is a vertical section of a piston and its ring grooves showing the oil and compression rings installed therein, these rings being shown in section, the section through the oil rings being indicated at 9—9 in Fig. 1, and the section through the compression rings being indicated at 9'—9' in Fig. 2.

Referring first to Figs. 1, 3 and 4, there is illustrated a ring particularly intended as an oil ring and the manner of constructing the same. Such a ring is made from a blank of a suitable alloy such as illustrated in Fig. 3 which has been cut to form what becomes the ring proper 1 and a plurality of spacing elements 2 separated by notches 3. These spacing elements 2 have preferably first bent upon the ring proper and the ring thereafter bent to circular form in the usual manner of forming piston oil rings. The spacing elements 2 are formed on the inner edge of the ring and are each of a dimension in cross-section less than the cross-sectional dimensions of the ring so that the outer periphery of the completed ring will constitute a continuous oil scraping surface. The notches 3 between the spacing elements 2 act as oil channels to permit the oil to escape through the usual apertures 4 which lead from the bottom of the groove 5 of the piston 6 which receives the oil rings 1. Two of these oil rings are installed in the groove 5 with the spacing elements 2 placed face to face as shown in Fig. 9 so as to hold the rings in spaced relation. The oil rings have an inherent resiliency in the usual way.

Referring next to Figs. 2, 5 and 6 there is illustrated a compression ring and the manner of constructing the same. This ring is made from a blank of a suitable alloy such as illustrated in Fig. 5 which has been cut to form what becomes the ring proper 7 and a continuous spacing element 8. This spacing element 8 is first preferably bent upon the ring 7 and the ring thereafter bent to circular form in the usual manner of forming piston compression rings. The spacing member 8 is formed on the inner edge of the ring and is of a dimension in cross section less than the cross-sectional dimensions of the ring so that the outer periphery of the completed ring will constitute a continuous compression surface. These compression rings have an inherent resiliency in the usual way and are installed in the grooves 9 in the piston, with two rings in each groove, the spacing elements 8 being placed face to face as shown in Fig. 9 so as to hold the rings in spaced relation.

The low pressure expanding device is shown in Figs. 7, 8 and 10. In Fig. 7 the device is shown before it is bent to ring form and in Fig. 8 after it has been bent to ring form. The device consists of a series of segmental inner bearing members 11 and a series of segmental outer bearing members 12 arranged in staggered relation and connected by expansion members 13. The device is formed of a single piece of spring metal and expansion members 13 are of a slight S-formation so as to give the desired spring effect to force the outer members 12 into yielding contact with the piston rings, the inner members 11 being seated upon the bottom of the piston groove. This device may be used either in connection with the oil rings 1 or with the compression rings 7 as shown in Fig. 10. At the point of juncture of each of the expansion members 13 with the inner and outer bearing members 11 and 12 it is constructed so as to lie closely adjacent each of said members as indicated at 13' but leaving a small open space 13" at the extreme point of juncture and by this arrangement any tendency of the parts to break apart due to continuous flexing is obviated. The central portion of each of the bearing members 11 and 12 is formed with a recess 14 on each side edge thereof to facilitate the passage of any oil that finds its way either past the oil rings or the compression rings.

This construction is particularly adapted to a type of piston ring now in common use made of special wear-resisting alloy created to long retain its inbuilt characteristics. Both the oil rings and the compression rings have an inbuilt expansion force of their own in a manner common to piston rings, this expansion force being just slightly less than the conventional cast iron ring but die to their numerous contacting surfaces give a unit pressure on the cylinder wall which is ideally correct for new motor installations or refinished cylinder bores without the use of the low expansion member. This low pressure expansion member is used more particularly on old motors or motors which have been reconditioned. When the inner expansion device is used, the combined expansion force of the piston rings plus that of the low pressure expander is only slightly in excess of a conventional piston ring, but due to the independent action of the piston rings controlled by the low pressure expander there is obtained a perfect cylinder wall contact under all conditions regardless of speed or high compression with no ring vibration or flutter, which insures sealed compression and controlled oil consumption at all times and at all speeds. In connection with the inner low pressure expander the expansion members 13 receive no wear for their only function is to flex, while the rubbing or wearing action is distributed over the oil bearing faces of the members 11 and 12, thus causing the low pressure expander to retain its original effectiveness throughout its life. The construction also affords an inexpensive method of adapting the new long-wearing alloys to piston ring use and provides for a ring which is practically non-breakable,

Having thus described my invention, I claim:

1. A piston ring having integrally formed spacing means bent from the inner edge thereof and overlying one side thereof, said spacing means being of less cross-sectional dimension than the cross-sectional dimension of said ring and lying at the side of the ring in a plane parallel therewith.

2. A piston ring having integrally formed spacing means bent from the inner edge thereof and overlying one side thereof in a plane parallel therewith, said spacing means being of less cross-sectional dimension than the cross-sectional dimension of said ring, and a similarly formed ring opposed to said first ring with the spacing means of said rings in face to face relation to maintain said rings in spaced relation in a piston groove.

3. A piston ring formed of spring metal having at least part of its inner edge bent upon the ring proper to provide spacing means, said spacing means being of less cross-sectional dimension than the cross-sectional dimension of the ring and lying at the side of the ring in a plane parallel therewith.

4. A piston ring formed of spring metal having at least part of its inner edge bent upon the ring proper in a plane parallel therewith to provide spacing means, said spacing means being of less cross-sectional dimension than the cross-sectional dimension of the ring, and a similarly formed ring opposed to said first ring with the spacing means in face to face relation to maintain said rings in spaced relation in a piston groove.

5. A piston ring having integrally formed separated spacing elements bent from the inner edge of said ring and overlying one side thereof in a plane parallel therewith, said spacing elements being of less cross-sectional dimension than the cross-sectional dimension of the ring.

6. A piston ring having integrally formed separated spacing elements bent from the inner edge of said ring and overlying one side thereof in a plane parallel therewith, said spacing elements being of less cross-sectional dimension than the cross-sectional dimension of the ring, and a similarly formed ring opposed to said first ring with the spacing elements in face to face relation to maintain said rings in spaced relation in a piston groove.

7. A piston ring having an integrally formed spacing means bent from the inner edge thereof and being of a continuous character, said spacing means overlying one side edge of said ring in a plane parallel therewith, said spacing means being of less cross-sectional dimension than the cross-sectional dimension of the ring.

8. A piston ring having an integrally formed spacing means bent from the inner edge thereof and being of a continuous character, said spacing means overlying one side edge of said ring in a plane parallel therewith, said spacing means being of less cross-sectional dimension than the cross-sectional dimension of the ring, and a similarly formed ring opposed to said first ring with the spacing means in face to face relation to maintain said rings in spaced relation in a piston groove,

VERGIL M. LUTZ.